March 25, 1969   G. D. ALLEN ET AL   3,434,411
VENTED CAULS
Filed Dec. 11, 1964
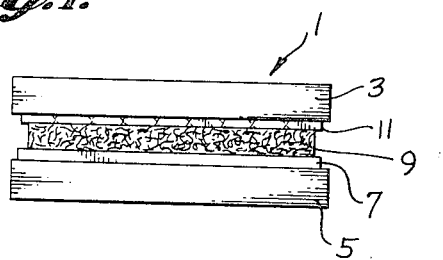
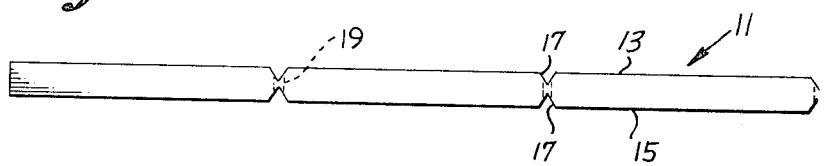
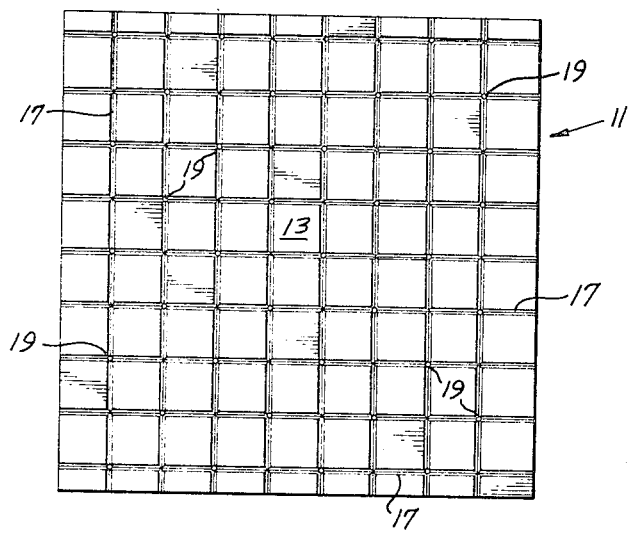
INVENTORS
GILBERT D. ALLEN
GENE A. GROVE
BY
ATTORNEYS

United States Patent Office 3,434,411
Patented Mar. 25, 1969

3,434,411
VENTED CAULS
Gilbert D. Allen, Mount Clemens, Mich., and Gene A. Grove, Longview, Wash., assignors to Weyerhaeuser Company, Tacoma, Wash., a corporation of Washington
Filed Dec. 11, 1964, Ser. No. 417,575
Int. Cl. B30b 15/06, 9/00
U.S. Cl. 100—90                                                  6 Claims

ABSTRACT OF THE DISCLOSURE

A caul plate grooved on both of its major surfaces with vent holes connecting the grooves in one surface with the grooves in the other. To eliminate blisters and delaminations of the surface material of the fiberboard previously caused by too rapid an escape of volatiles during the molding pressure application step, the vented caul plates are inserted between the fiberboard mat surface and the platen of the densifying press.

---

This invention relates to the production of fiberboard and particularly relates to the final production operation of densifying the fiberboard mat to its final moulded shape and form.

In the production of fiberboard products, moisture, resin solvents, and other materials are mixed within the structure of the fiberboard mat and during the final forming step in the production of a useful fiberboard product, these volatiles must be allowed to escape or else they will cause damage to the molded product. It is customary to store and ship fiberboards in a mat form having a density of from 25 to 40 lbs./cu. ft. At the location where the fiberboard mat is to be worked to its final form, it may be pre-steamed and then placed into a press where it is subjected to heat and pressure which cures the binders within the mat and densifies the mat to its final form.

To date the method for densifying the mat has been by building up the initial pressure applied to the mat in a gradual manner, releasing the pressure to allow volatiles trapped within it to escape, and then subjecting the mat to a second imposed pressure which is decreased and held to obtain a final cure of the fiberboard mat. Such a method involves a long press cycle, which adds to the cost of producing the fiberboard product.

Attempts have been made to speed up the curing process, but any acceleration of the pressing cycle has caused detrimental effects on the molded sample. During the press cycle, blisters in the mat surface are caused by improper venting of the moisture and other volatiles which have collected beneath the surface of the fiberboard. Also, delaminations of the mat layers occur due to a rapid release of the volatiles under pressure causing a separation of fibers from the surface of the board.

Whenever such detrimental effects have been noted in fiberboard products the pressing cycle has been extended to insure the proper venting of the volatiles through the fiber material. Some attempts have been made to insert screens, embossed plates and grids between the press platens and the fiberboard mat to provide a means for venting the volatiles. However, screens generally collect fiber materials and become gummed up through the action of the adhesives and as a result increase the machine downtime due to clean-up requirements. Embossed plates and grids produce the undesirable effect of ribbing and scoring of the fiberboard surfaces.

Applicants have found, by inserting a specially grooved and vented caul plate between the mat surface and the platen of the densifying press, that desirable venting is experienced without producing the disadvantages caused by previously used screens, plates, and grids. It is, therefore, an object of this invention to provide a means for venting the volatile materials in a fiberboard mat during the molding cycle with one application of pressure without the need for a release of this pressure prior to applying a final pressure to allow for release of the volatiles.

It is a further object of this invention to provide a means for allowing the volatiles of a fiberboard mat to escape during the imposition of pressure upon the mat through a means in contact with one surface of the mat without formation of blisters and delaminations of the fiberboard material.

It is a further object of this invention to provide a means for venting volatiles from a fiberboard mat which is subjected to densifying pressures which means does not require costly maintenance and clean-up time and which produces fiberboard mats without scored and embossed surfaces.

Further objects and advantages of the present invention will be more readily ascertained from an inspection of the accompanying drawings taken in connection with the following specification wherein like numerals refer to like parts throughout.

In the drawings,

FIGURE 1 is a side elevation view of a typical press incorporating the improved vented caul in accordance with the teaching of this invention;

FIGURE 2 is a partial side elevation view of the vented caul in accordance with the present invention; and FIGURE 3 is a plan view showing the surface configuration of the vented caul in accordance with the present invention.

Referring now in more detail to FIGURE 1, there is shown a press assembly 1, which comprises top platen 3 and bottom platen 5 which can move relative to one another to press between them the smooth caul 7 which is supported on the bottom platen 5, the fiber mat 9, and the vented caul 11.

In FIGURE 2, there is shown a part of the vented caul 11 having upper surface 13 and lower surface 15. Grooves 17, which may be V shaped, may be cut or milled into the upper and lower surfaces 13 and 15 at intervals to provide passageways for the escaping volatiles to the sides of the press assembly 1, and may include additional passageways through the vertical vent apertures 19, shown in dashed lines, which are holes drilled through the vented caul 11 at the intersection of the grooves 17.

FIGURE 3 shows a plan view of the upper surface 13 of the vented caul 11 with the grooves 17 shown intersecting. The small vertical vent apertures 19 may be located at every other intersection of the grooves 17.

In tests we have found that ¼" thick aluminum plates may be grooved and vented to provide adequate means to vent the volatiles from fiber mats during their densifying pressing cycle. For example, aluminum plates 18" x 18" x ¼" were grooved to V shape grooves which were 2" apart with ¹⁄₁₆" diameter holes drilled at alternate groove intersections. Fiber mats having a density of 35 lbs./cu. ft. were pressed after steaming in a press assembly similar to the one shown in FIGURE 1 at pressures in the range of 350 to 700 p.s.i.g. for 15 seconds in a single pressure application cycle to temperatures up to 350° F.

It has been found that the width and depth of the grooves provide various effects on the compressed fiber mat. For example, with grooves .020" wide and .020" deep, it was found that as the fiber mat 9 was being densified to approximately 64 lbs./cu. ft. that all of the grooves 17 emitted volatiles and that when the pressure was decreased rapidly and the press opened there were no blisters or delaminations noted in the compressed mat 9. With grooves 0.04" wide and deep, the release of volatiles during the imposition of pressure was more even than the spurts noted with the 0.020″ grooves and the surfaces of the densified fiber mats 9 were even more smooth with little mottling occurring. With grooves 0.060″ wide and deep the volatile release was greater than for the smaller sizes with a steady release of volatiles throughout the press cycle and the surface of the fiber mats showed even less mottling than on the mats pressed under the 0.040″ grooved vented caul.

It appears that as the grooving area is increased, the water absorption and swell values of the fiber mat also increase. It has also been shown that grooving of the caul is somewhat detrimental to most strength properties except for impact strength which is increased as the vented groove area is increased.

Thus, it is seen that we have provided a solution to the volatile venting problem which has been present in past methods of densifying fiber products. Our vented cauls eliminate blistering, and delamination failures, and provide short molding cycle times with fast pressure releases. It has also been observed that even distribution of color on the final molded part is obtained with the use of vented cauls.

Having now described our invention and in what manner the same may be used, what we claim as new and desire to protect by Letters Patent is:

1. In an apparatus for compressing substantially rigid fiber mats containing volatiles
    a press having opposed pressure platens
    a one piece caul means positioned between at least one surface of said substantially rigid mat and a platen
    said caul means being relatively thin and having two major surfaces which define intersecting symmetrically opposed grooves which permit venting of said volatiles from said mats when pressure is applied through said platen and said caul means to said mat.

2. The apparatus of claim 1 wherein said caul means defines apertures connecting opposed grooves which provide a passage of said volatiles through said caul means whereby the pressure is equalized.

3. The apparatus of claim 2 wherein said grooves are between 0.015 and 0.065 inch deep and between 0.015 and 0.065 inch wide at their widest spot.

4. The apparatus of claim 2 wherein said apertures are positioned at intersections of said grooves.

5. The apparatus of claim 4 wherein said apertures are between 0.05 and 0.1 inch in diameter.

6. The apparatus of claim 1 wherein said grooves are spaced approximately two inches apart.

References Cited

UNITED STATES PATENTS

| | | | |
|---|---|---|---|
| Re.23,829 | 5/1954 | Goss | 264—120 |
| 266,372 | 10/1882 | Krutzsch | 100—125 |
| 363,701 | 5/1887 | Vaile | 100—115 |
| 1,504,450 | 8/1924 | Henry | 100—115 X |
| 1,553,310 | 9/1925 | Ellis | 100—115 X |
| 2,268,477 | 12/1941 | Elmendorf | 156—87 |
| 3,277,814 | 10/1966 | Malm et al. | 100—295 |

FOREIGN PATENTS 358,516  4/1938  Italy.

WALTER A. SCHEEL, *Primary Examiner.*

U.S. Cl. X.R.

100—115, 125, 295